(12) United States Patent
Kimoto et al.

(10) Patent No.: US 8,166,489 B2
(45) Date of Patent: Apr. 24, 2012

(54) IMAGE PROCESSING APPARATUS, IMAGE PROCESSING METHOD AND IMAGE PROCESSING PROGRAM HAVING MULTI-PROCESSING MODE

(75) Inventors: Yuko Kimoto, Kanagawa-ken (JP); Naoki Hoshino, Saitama-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1083 days.

(21) Appl. No.: 11/753,613

(22) Filed: May 25, 2007

(65) Prior Publication Data

US 2008/0295115 A1    Nov. 27, 2008

(51) Int. Cl.
    *G06F 3/00*    (2006.01)
    *G06F 9/44*    (2006.01)
    *G06F 9/46*    (2006.01)
    *G06F 13/00*    (2006.01)

(52) U.S. Cl. .................................... 719/321
(58) Field of Classification Search ................... 719/321
See application file for complete search history.

(56) References Cited

U.S. PATENT DOCUMENTS

| | | | | |
|---|---|---|---|---|
| 5,699,494 | A * | 12/1997 | Colbert et al. | 358/1.15 |
| 5,946,412 | A * | 8/1999 | Nishikawa | 382/162 |
| 6,343,147 | B2 * | 1/2002 | Yamamoto | 382/167 |
| 7,542,159 | B2 * | 6/2009 | Yamada | 358/1.15 |
| 2005/0053280 | A1 * | 3/2005 | Nishikawa | 382/167 |

FOREIGN PATENT DOCUMENTS

| | | |
|---|---|---|
| JP | 2004-025550 | 1/2004 |
| JP | 2005-111994 | 4/2005 |
| JP | 2006-043896 | 2/2006 |

* cited by examiner

*Primary Examiner* — Andy Ho
*Assistant Examiner* — Timothy A Mudrick
(74) *Attorney, Agent, or Firm* — Turocy & Watson, LLP (57) ABSTRACT

An image processing apparatus that executes, on the basis of a command transmitted from a driver apparatus, predetermined processing corresponding to the command includes a setting-information acquiring unit that acquires setting information indicating setting contents of processing instructed by the driver apparatus, a setting-information displaying unit that displays the setting information acquired by the setting-information acquiring unit, an operation accepting unit that accepts operation for the setting-information displayed by the setting-information displaying unit, and a setting executing unit that executes processing with the setting contents that reflect the operation accepted by the operation accepting unit.

12 Claims, 9 Drawing Sheets

IMAGE PROCESSING APPARATUS, IMAGE PROCESSING METHOD AND IMAGE PROCESSING PROGRAM HAVING MULTI-PROCESSING MODE

BACKGROUND OF THE INVENTION

1. Field of the Invention

The present invention relates to a technique that can contribute to a reduction in a burden of work on a user in an image processing system in which a driver apparatus gives a command for execution of processing to an image processing apparatus and causes the image processing apparatus to execute desired processing.

2. Description of the Related Art

Conventionally, there is known a technique in which a driver apparatus gives an instruction for execution of processing to an image processing apparatus and causes the image processing apparatus to execute desired processing. There is also an image processing apparatus having a test mode (examine printing setting mode) which determines whether the setting contents of the processing is proper or not, based on a result of processing.

In the conventional processing according to the "test mode", first, after causing the image processing apparatus to execute the processing, a user has to confirm a processing state and, when correction of a setting is necessary, the user present near the image processing apparatus has to return to the driver apparatus and correct the setting. For taking a printed document, the user also has to move to the image processing apparatus from the driver apparatus. Thus, the movement between the image processing apparatus and the driver apparatus imposes a burned on the user.

SUMMARY OF THE INVENTION

It is an object of an embodiment of the invention to provide, in an image processing system in which a driver apparatus gives a command for execution of processing to an image processing apparatus and causes the image processing apparatus to execute desired processing, a technique that can contribute to a reduction in a burden of work on a user.

In order to solve the problem, an image processing apparatus according to an aspect of the invention is an image processing apparatus that executes, on the basis of a command transmitted from a driver apparatus, predetermined processing corresponding to the command. The image processing apparatus is characterized by including a setting-information acquiring unit that acquires setting information indicating setting contents of processing instructed by the driver apparatus, a setting-information displaying unit that displays the setting information acquired by the setting-information acquiring unit, an operation accepting unit that accepts operation for the setting-information displayed by the setting-information displaying unit, and a setting executing unit that executes processing with the setting contents that reflect the operation accepted by the operation accepting unit.

An image processing method according to another aspect of the invention is an image processing method of causing an image processing apparatus to execute, on the basis of a command transmitted from a driver apparatus, predetermined processing corresponding to the command. The image processing method is characterized by including a setting-information acquiring step of acquiring setting information indicating setting contents of processing instructed by the driver apparatus, a setting-information displaying step of displaying the setting information acquired in the setting-information acquiring step, an operation accepting step of accepting operation for the setting-information displayed by the setting-information displaying step, and a setting executing step of executing processing with setting contents that reflect the operation accepted in the operation accepting step.

An image processing program according to still another aspect of the invention is an image processing program for causing a computer to execute processing for causing an image processing apparatus to execute, on the basis of a command transmitted from a driver apparatus, predetermined processing corresponding to the command. The image processing program is characterized by causing the computer to execute a setting-information acquiring step of acquiring setting information indicating setting contents of processing instructed by the driver apparatus, a setting-information displaying step of displaying the setting information acquired in the setting-information acquiring step, an operation accepting step of accepting operation for the setting-information displayed by the setting-information displaying step, and a setting executing step of executing processing with setting contents that reflect the operation accepted in the operation accepting step.

DESCRIPTION OF THE EMBODIMENTS

An embodiment of the invention will be hereinafter explained with reference to the drawings.

Figure 1:
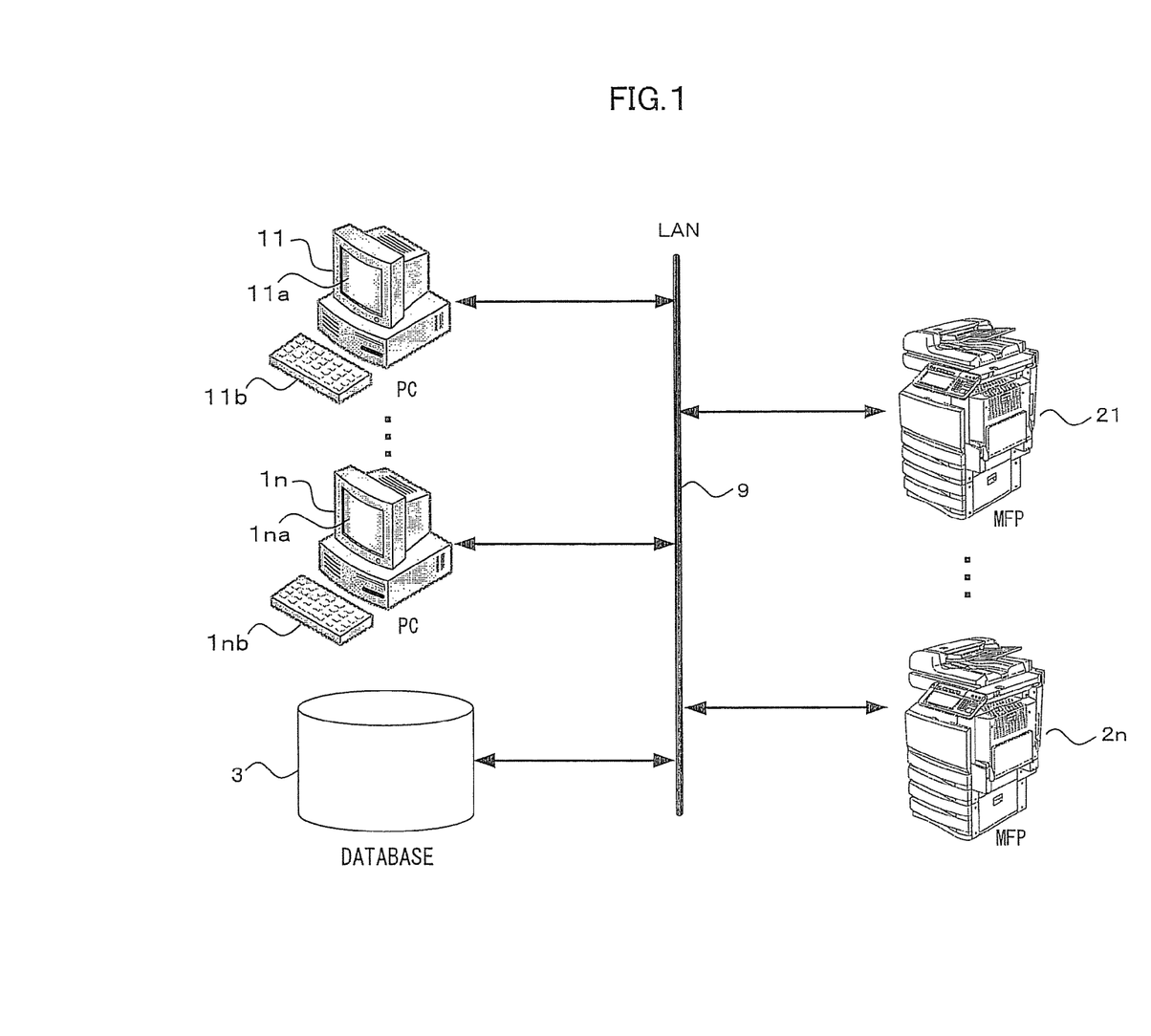
FIG. 1 is a diagram showing a configuration of an image processing system including a PC (including a driver apparatus) 11 and an image processing apparatus 21 according to an embodiment of the invention.

FIG. 1 is a diagram showing a configuration of an image processing system including a PC (including a driver apparatus) 11 and an image processing apparatus 21 according to this embodiment. In the image processing system shown in the figure, PCs (Personal Computers) 11 to 1*n*, image processing apparatuses 21 to 2*n*, and a database 3 are connected to be capable of communicating with one another via a telecommunication line such as a LAN 9.

Means for connecting the PCs 11 to 1*n*, the image processing apparatuses 21 to 2*n*, and the database 3 to be capable of communicating with one another is explained as the LAN here. However, the means is not limited to this and may be the Internet, a WAN, and the like (the means may be either wired or wireless). The PCs 11 to 1n are capable of performing various kinds of setting concerning an image processing function executable in the image processing apparatuses 21 to 2n and giving, for example, commands for execution of various processing functions to the image processing apparatuses 21 to 2n.

The commands and the like given to the image processing apparatuses 21 to 2n by the PCs 11 to 1n are performed by the driver apparatuses included in the PCs 11 to 1n on the basis of operation inputs performed by users, who look at setting screens displayed on displays 11a to 1na included in the PCs 11 to 1n, using operation inputting units (e.g., keyboards or mouses) 11b to 1nb. The example in which the displays and the operation inputting units are separately provided is cited here. However, the displays and the operation inputting units are not limited to this. For example, the functions of the displays and the operation inputting units may be realized by touch panel displays.

The PCs 11 to 1n are capable of executing, on the basis of results of processing in the image processing apparatuses 21 to 2n, commands in one of a "test mode (proof printing setting mode)" for examining suitability of setting contents of the processing and a "normal mode" for causing the image processing apparatuses 21 to 2n to execute processing on the basis of setting contents.

The database 3 has a role of a storage area that stores various kinds of setting information and the like used in the PCs 11 to 1n and the image processing apparatuses 21 to 2n.

Figure 2:
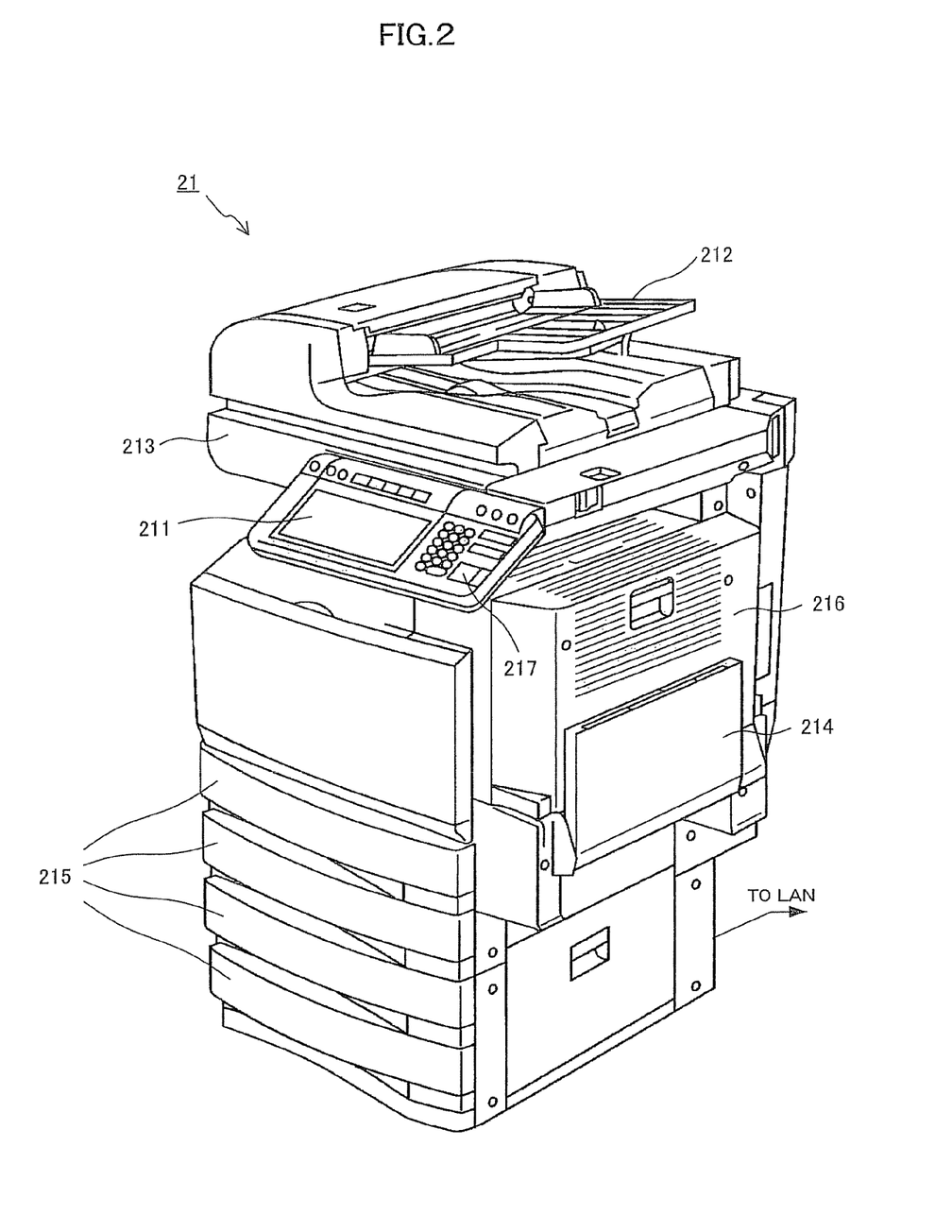
FIG. 2 is an external perspective view for explaining an overview of the image processing apparatus 21 according to the embodiment.

FIG. 2 is an external perspective view for explaining an overview of the image processing apparatus 21 according to this embodiment. Here, as an example, an example in which the image processing apparatus 21 is an MFP (Multi Function Peripheral) is cited.

The image processing apparatus 21 according to this embodiment includes an interface screen 211, an ADF (Auto Document Feeder) 212, an image scanning unit 213, a manual sheet feeing unit 214, sheet feeding cassettes 215, an image forming unit 216, and an authentication processing unit 217.

An example of operations of the image processing apparatus 21 according to this embodiment will be hereinafter briefly explained. When, for example, copy processing (predetermined image processing) is performed in the image processing apparatus 21, first, authentication processing for a user is performed by the authentication processing unit 217. Subsequently, an original set in the ADF 212 is automatically conveyed to a position for original scanning by the image scanning unit 213 on the basis of an operation input to the interface screen 211 by the user who has succeeded in the authentication processing. An image of the original conveyed in this way is scanned by the image scanning unit 213. A sheet feeding operation is performed by any one of the sheet feeding cassettes 215 and the manual sheet feeding unit 214 according to a sheet feeding method selected on the basis of the operation input to the interface screen 211. A sheet fed is conveyed to the image forming unit (an image processing unit) 216 and applied with image formation processing based on the image scanned by the image scanning unit 213. The copy processing is completed.

The interface screen 211 is constituted by, for example, a touch panel display. The interface screen 211 performs screen display of various kinds of information and also has a role of an operation inputting unit that accepts an operation input of the user based on display contents on the interface screen 211.

The image processing apparatus 21 is capable of executing plural functions different from one another such as a "print function" of performing print processing on the basis of image data acquired by the image processing apparatus 21, a "facsimile function" of transmitting the image data acquired by the image processing apparatus 21 (image data scanned from an original, image data received from an external apparatus, etc.) to a desired destination by facsimile, a "scan function" of scanning an image of the original, and a "box function" of storing the image data scanned from the original by the "scan function" in the image processing apparatus 21 in a desired storage area. The "box function" is capable of selecting, as a data storage destination (a destination), at least any one of the PCs 11 to 1n and the image processing apparatuses 22 to 2n connected to the image processing apparatus 21 to be capable of communicating with each other. It is possible to realize a copy function by causing the image processing apparatus 21 to execute the "scan function" and the "print function" in combination.

As processing objects of the predetermined processing in the image processing apparatus 21, a sheet original, a book-like original, image data, and the like are cited as examples.

Figure 3:
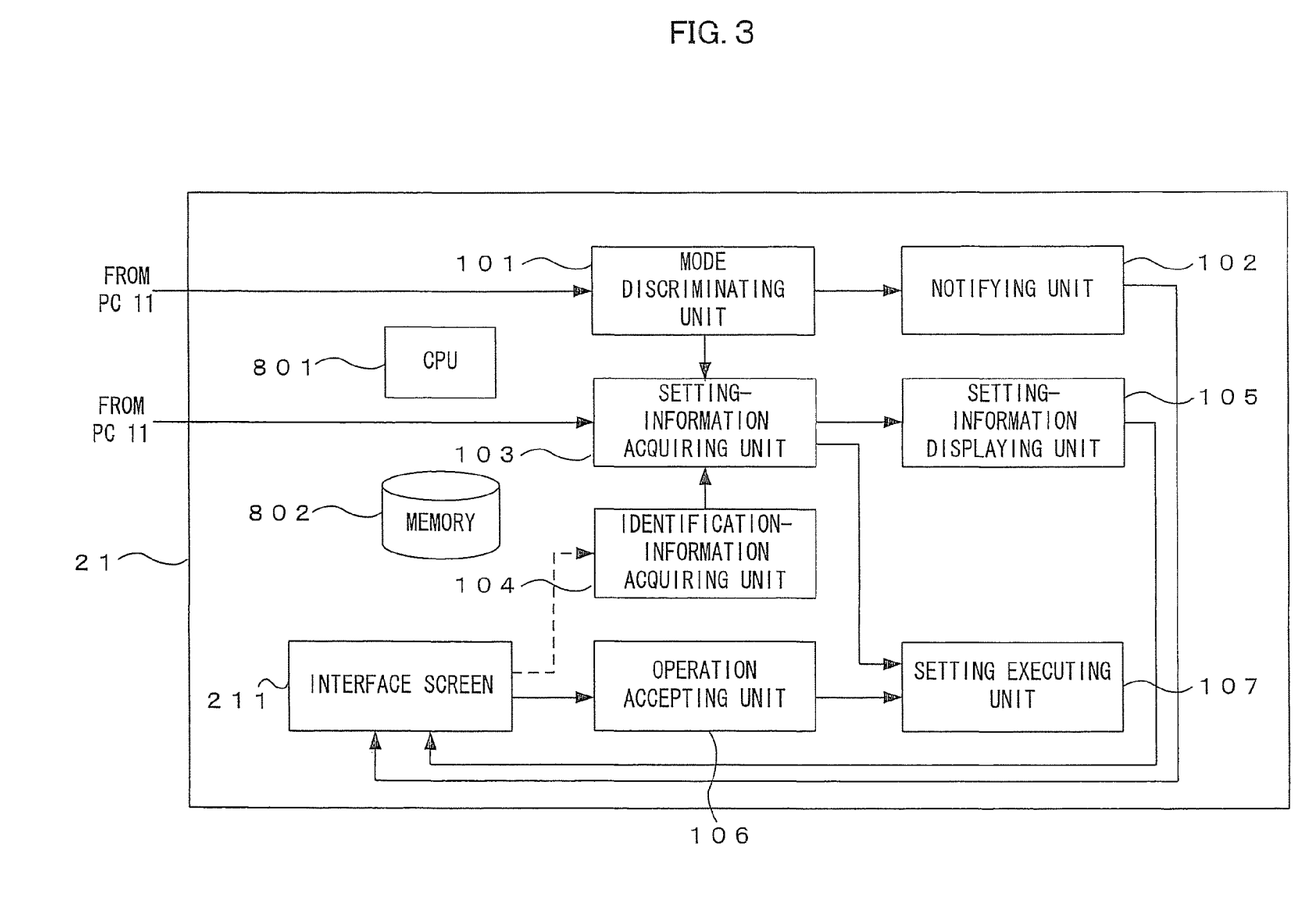
FIG. 3 is a functional block diagram for explaining the image processing apparatus 21 according to the embodiment.

FIG. 3 is a functional block diagram for explaining the image processing apparatus 21 according to this embodiment. In this embodiment, the PCs 11 to 1n have the same components. The image processing apparatuses 21 to 2n also have the same components. It is possible to realize the image processing system according to this embodiment with any one of the image processing apparatuses 21 to 2n and any one of the PCs 11 to 1n. Thus, functions of the image processing system including the image processing apparatus 21 and the PC 11 will be hereinafter explained in detail as an example.

The PC 11 (equivalent to the driver apparatus) according to this embodiment causes the image processing apparatus to execute plural functions (e.g., the print function, the facsimile function, the scan function, and the box function) executable in the image processing apparatus on the basis of setting contents set in setting screens corresponding to the respective functions. The image processing apparatus 21 and the PC 11 according to this embodiment display plural setting screens for performing setting for each of the plural functions executable in the image processing apparatus 21, which are plural setting screens (a printer driver screen, a facsimile driver screen, a scanner driver screen, etc.) that can display plural setting items in the respective functions on the respective setting screens, such that selection of the setting screens can be switched.

Specifically, the image processing apparatus 21 according to this embodiment includes a mode discriminating unit 101, a notifying unit 102, a setting-information acquiring unit 103, an identification-information acquiring unit 104, a setting-information displaying unit 105, an operation accepting unit 106, a setting executing unit 107, a CPU 801, and a MEMORY 802.

The mode discriminating unit 101 discriminates, in accepting commands for execution of various processing functions (e.g., the print function, the facsimile function, the scan function, and the box function), which of the "normal mode" and the "test mode" a processing mode for the commands from the PC 11 is.

The notifying unit 102 notifies, when it is discriminated by the mode discriminating unit 101 that the processing mode is the "test mode", that the processing mode is the "test mode" using sound or screen display on the interface screen 211. In this embodiment, the indication of "test printing is set" shown in FIG. 6 described later is equivalent to the notification.

The setting-information acquiring unit 103 acquires setting information indicating setting contents of processing instructed by the PC 11. The setting-information acquiring unit 103 in this context requests the setting information when the processing mode is discriminated as the "test mode" by the mode discriminating unit 101.

The setting-information acquiring unit 103 acquires, during execution of spool processing for processing object data transmitted from the PC 11 (before and after execution timing for the spool processing, during the spool processing, etc.), setting information transmitted from the PC 11 to the image processing apparatus 21.

The identification-information acquiring unit 104 acquires identification information for identifying a user who performs operation for setting information displayed by the setting-information displaying unit 105.

The setting-information displaying unit 105 displays the "setting information" acquired by the setting-information acquiring unit 103 and the "identification information" acquired by the identification-information acquiring unit 104 as a list on the interface screen 211 in association with each other. In this case, an arrangement of respective setting items in a setting screen for displaying the setting information in the setting-information displaying unit 105 is the same as an arrangement of respective setting items in a setting screen for performing setting operation for predetermined processing in the PC 11.

The operation accepting unit 106 accepts, on the basis of an operation input to the touch panel constituting the interface screen 211, operation (changing operation, etc.) for the setting information displayed by the setting-information displaying unit 105.

The setting executing unit 107 causes the image processing apparatus 21 to execute processing with the setting contents that reflect the operation accepted by the operation accepting unit 106.

The CPU 801 has a role for performing various kinds of processing in the image processing apparatus 21 and also has a role of realizing various functions by executing a program stored in the MEMORY 802. The MEMORY 802 is constituted by, for example, a ROM or a RAM and has a role for storing various kinds of information and programs used in the image processing apparatus 21.

With the structure described above, the image processing apparatus 21 according to this embodiment has a function of executing, on the basis of a command transmitted from the driver apparatus, predetermined processing corresponding to the command.

Figure 4:
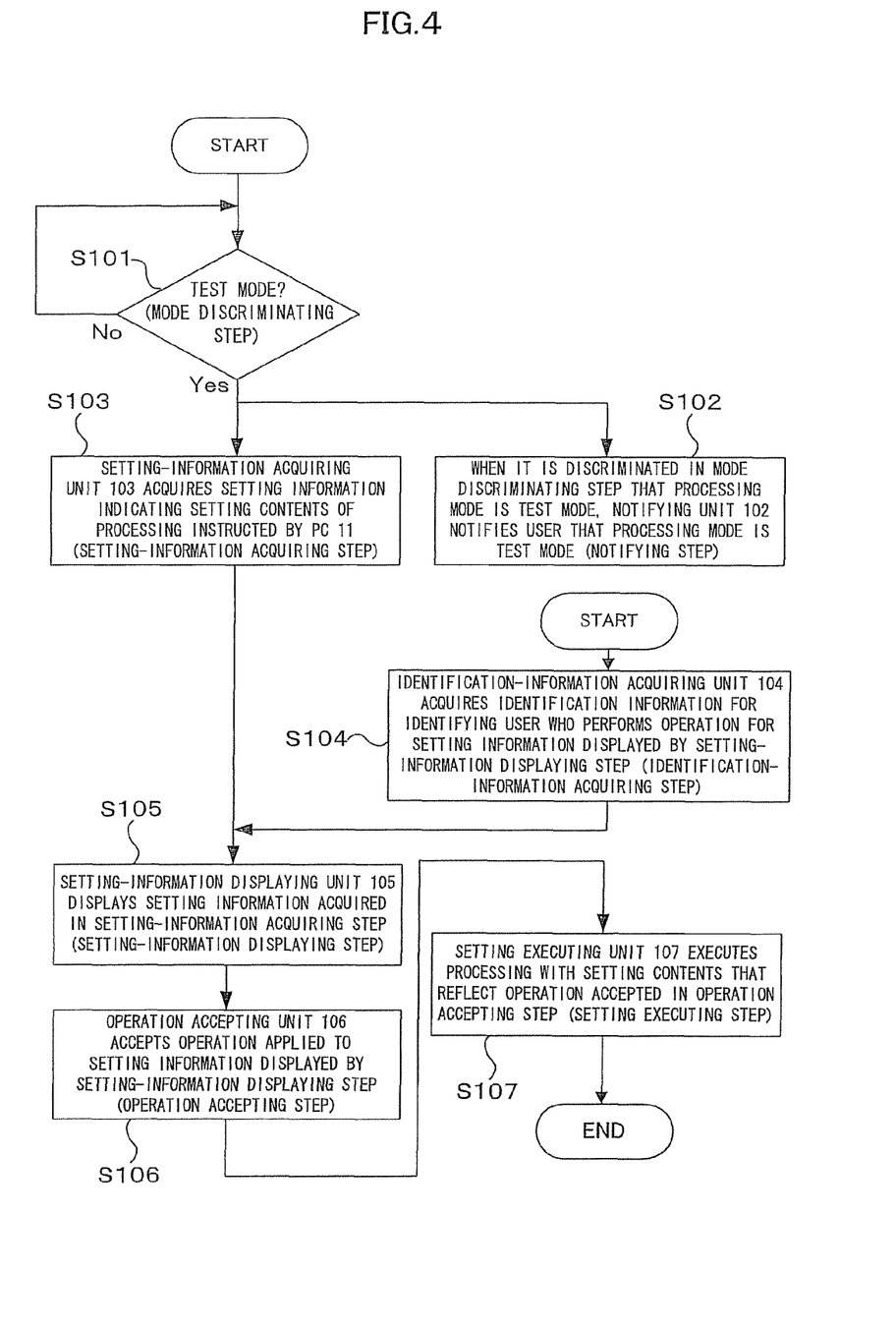
FIG. 4 is a flowchart for explaining a flow of processing (an image processing method) in the image processing apparatus according to the embodiment.

FIG. 4 is a flowchart for explaining a flow of processing (an image processing method) in the image processing apparatus according to this embodiment. Here, a case in which the image processing apparatus 21 is caused to execute print processing is cited as an example.

Here, a case in which a command for execution of processing in the "test mode" for examining, on the basis of results of processing in the image processing apparatuses 21 to 2*n*, suitability of setting contents of the processing is performed on the PC 11 side is cited as an example.

Figure 5:
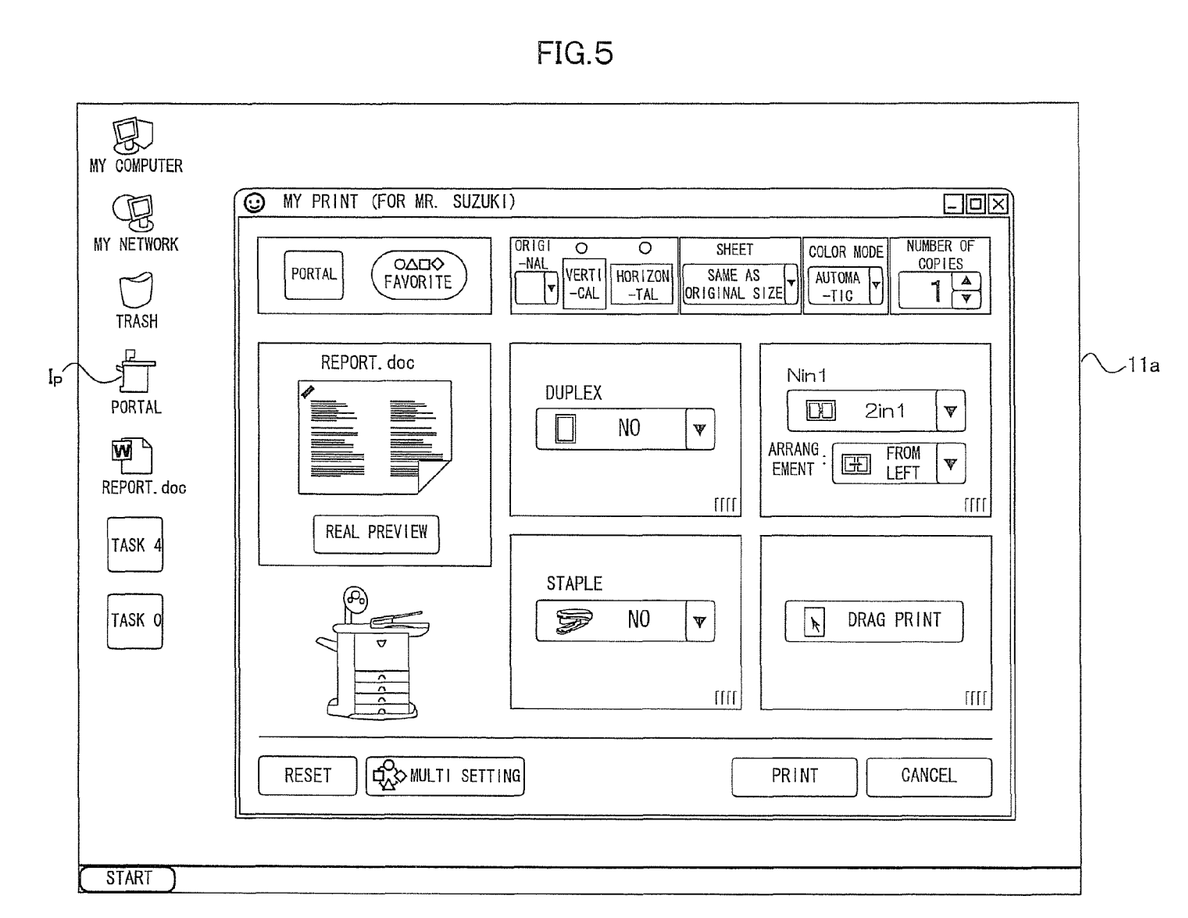
FIG. 5 is a diagram showing an example of a setting screen during print setting in the PC 11.

First, setting operation for print setting (an input for setting the number of copies, various parameters, and the like) in the "test mode" is performed according to an operation input to the operation inputting unit 11*b* by the user. FIG. 5 is a diagram showing an example of a setting screen during the print setting in the PC 11.

When the setting operation for the print setting is completed and a "Print" button in the setting screen shown in FIG. 5 is depressed, a command for execution of print processing with set contents is transmitted to the image processing apparatus 21.

In accepting a command for execution of processing from the PC 11, the mode discriminating unit 101 discriminates, on the basis of information transmitted from the PC 11 when the command is received, which of the "test mode" and the "normal mode" a processing mode is (a mode discriminating step) (S101).

When it is discriminated in the mode discriminating step that the processing mode is the test mode (S101, Yes), the notifying unit 102 notifies the user that the processing mode is the test mode using sound or screen display on the interface screen 211 (a notifying step) (S102).

The setting-information acquiring unit 103 acquires setting information indicating setting contents of the processing instructed by the PC 11 (a setting-information acquiring step) (S103). When it is discriminated in the mode discriminating step that the processing mode is the "test mode" (S101, Yes), the setting-information acquiring unit 103 requests the PC 11 to send the setting information. It goes without saying that, the setting-information acquiring unit 103 may acquire the setting information regardless of a type of the processing mode. The PC 11 may determine the processing mode and, only when the processing mode is the "test mode", transmit the setting information to the image processing apparatus 21.

In this embodiment, in the setting-information acquiring step, the setting information transmitted from the PC 11 to the image processing apparatus 21 is acquired during execution of the spool processing for processing object data transmitted from the PC 11 (including before and after execution timing for the spool processing and during the spool processing).

The identification-information acquiring unit 104 acquires identification information for identifying, on the basis of an authentication result in the authentication processing unit 217, a user who performs operation for the setting information displayed by the setting-information displaying step (an identification-information acquiring step) (S104). The identification-information acquiring step only has to be independent from the processing in S101 to S103 and executed prior to at least a setting-information displaying step described later.

Figure 6:
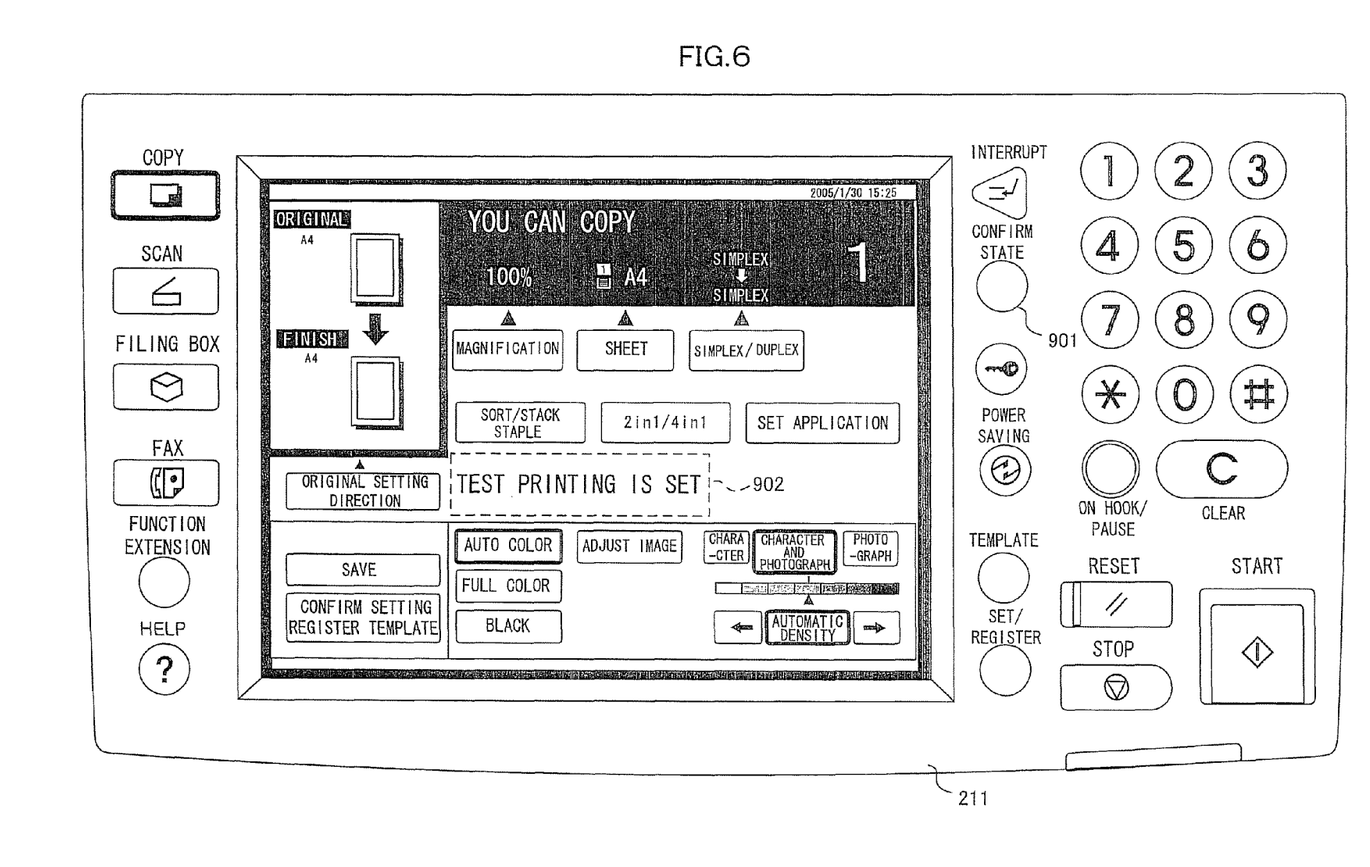
FIG. 6 is a diagram showing an example of screen display on an interface screen 211 at the time when print processing is performed according to a command from the PC 11.

When print processing is applied to one sheet as test printing according to the print setting set as described above, the user confirms the print processing and determines whether the print setting is appropriate. FIG. 6 is a diagram showing an example of screen display on the interface screen 211 when print processing is performed according to a command from the PC 11. As shown in the figure, an indication that the present print processing is performed in the "test mode (proof printing setting mode)" is displayed in the setting screen displayed on the interface screen 211.

Subsequently, when the user depresses a "State Confirmation" button 901 on the screen shown in FIG. 6 or a "test printing is set" message 902, the setting-information displaying unit 105 displays the setting information acquired in the setting-information acquiring step on the interface screen 211 (a setting-information displaying step) (S105).

Figure 7:
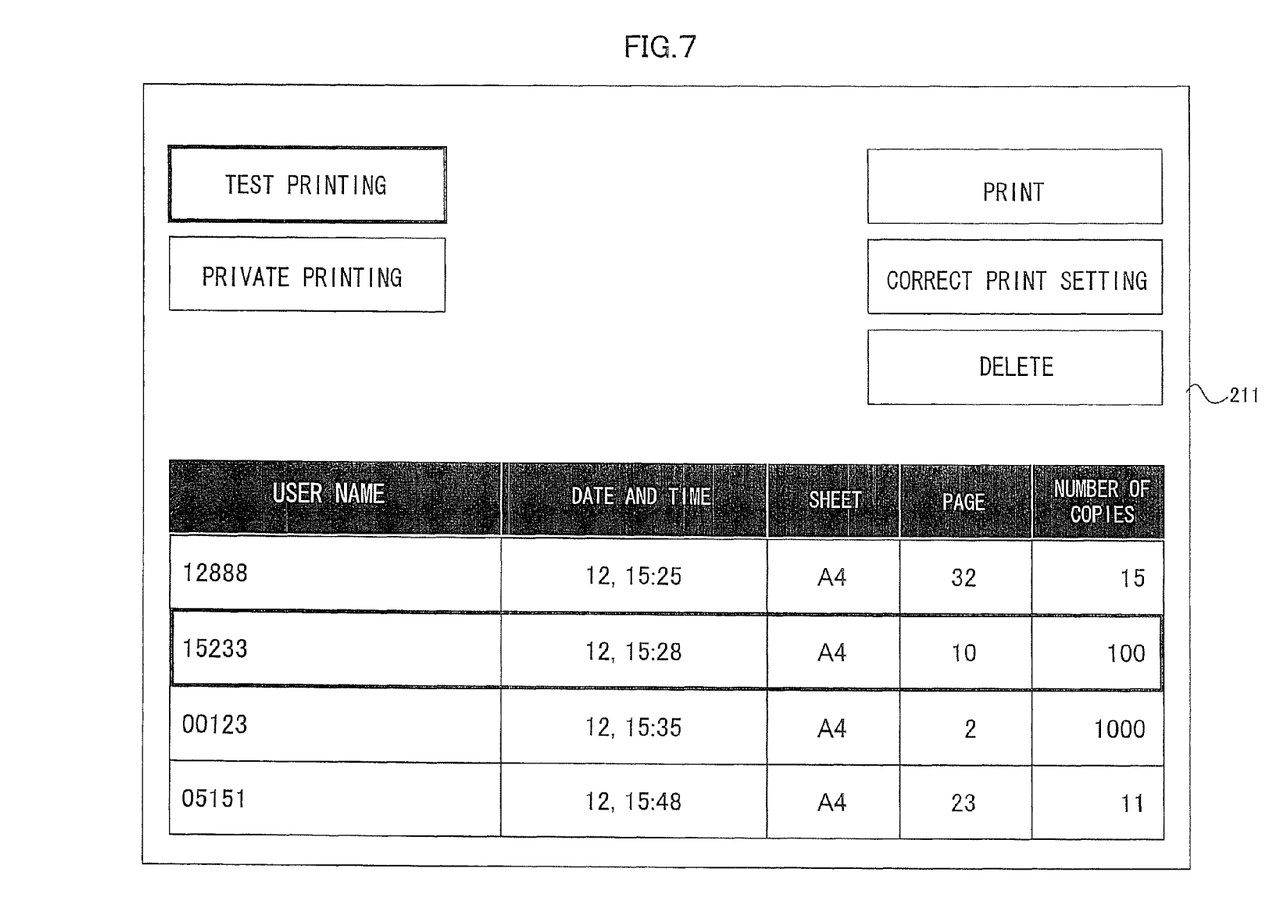
FIG. 7 is a diagram showing a state in which "setting information" acquired in a setting-information acquiring step and "identification information" acquired in an identification-information acquiring step are displayed as a list on the interface screen 211 in association with each other.

In the setting-information displaying step, as shown in FIG. 7, the "setting information" acquired in the setting-information acquiring step and the "identification information" acquired in the identification-information acquiring step are displayed as a list on the interface screen 211 in association with each other.

Figure 8:
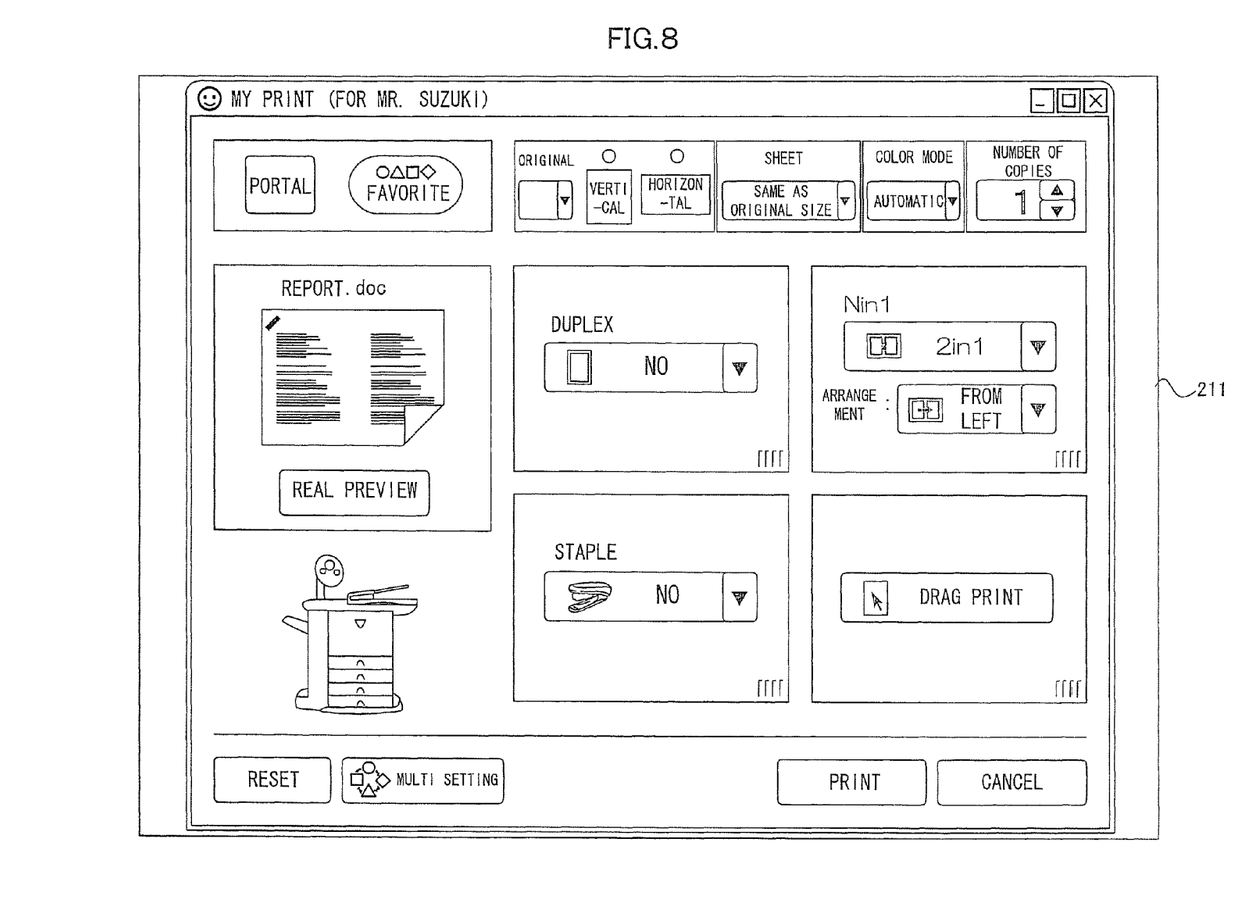
FIG. 8 is a diagram showing an example of a setting screen displayed on the interface screen 211.

When the user selects setting information corresponding to an own user name (e.g., "15233") out of the setting information displayed as the list in this way, a setting screen having the same structure as the setting screen displayed on the display 11a of the PC 11 is displayed on the interface screen 211 in a state in which the setting contents set in the PC 11 are reflected on the setting screen. FIG. 8 is a diagram showing an example of the setting screen displayed on the interface screen 211.

In this case, an arrangement of respective setting items in the interface screen for displaying the setting information in the setting-information displaying step is the same as an arrangement of respective setting items in the interface screen for performing setting operation for predetermined processing in the PC 11.

The operation accepting unit 106 accepts changing operation applied to the setting information, which is displayed by the setting-information displaying step, according to an operation input to the interface screen 211 by the user (an operation accepting step) (S106).

When the print setting is changed to desired setting contents, for example, according to depression of the "Print" button, the setting executing unit 107 executes processing with the setting contents that reflect the operation accepted in the operation accepting step (a setting executing step) (S107).

Figure 9:
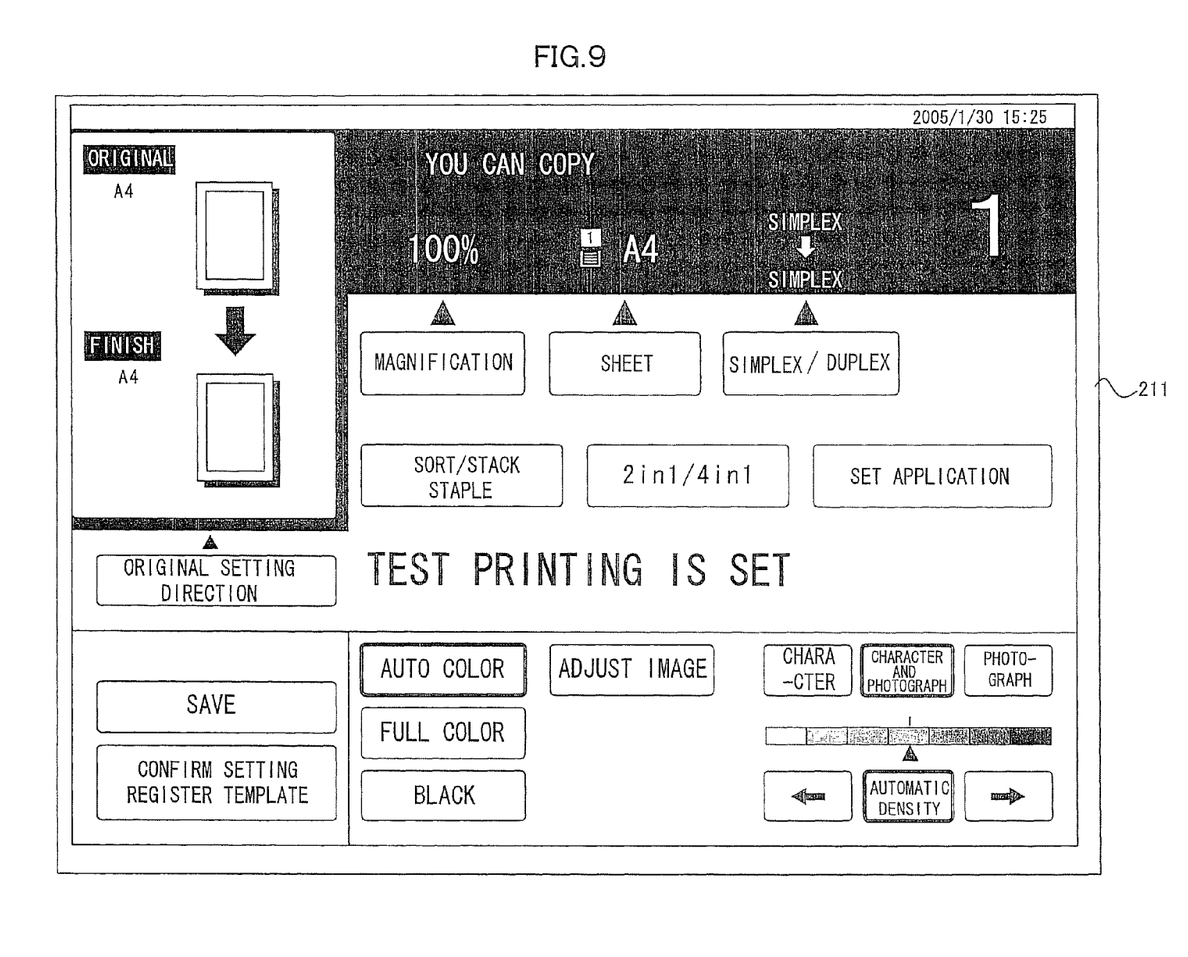
FIG. 9 is a diagram showing an example of a setting screen displayed on the interface screen 211 after execution of print processing.

After the execution of the print processing, a display screen shown in FIG. 9 is displayed on the interface screen 211.

The respective steps in the processing in the image processing apparatus 21 are realized by causing the CPU 801 to execute an image processing program stored in the MEMORY 802.

The setting information acquired by the setting-information acquiring unit 103 is stored in the MEMORY 802 until the print processing is completed for all the number of copies set during the execution of the proof printing setting mode. Thus, it is possible to change the setting information to an appropriate print setting when necessary.

According to this embodiment, when the print processing or the like employing a so-called "test printing function" is performed, it is possible to print one copy as a test first and, when a change of a print setting is necessary, display a screen same as a setting screen for a printer driver in the PC 11 on the image processing apparatus 21 side, and change the print setting in the image processing apparatus 21 in a sense as if the setting screen of the PC 11 is operated.

In the embodiment, the example in which the setting contents set in the PC 11 are utilized on the image processing apparatus 21 side. However, the invention is not limited to this. It goes without saying that, for example, the setting contents set in the image processing apparatus 21 can be utilized on the PC 11 side.

In the explanation of this embodiment, the functions of carrying out the invention are recorded in the apparatus in advance. However, the invention is not limited to this. The same functions may be downloaded from a network to the apparatus or the same functions stored in a recording medium may be installed in the apparatus. As the recording medium, a form of the recording medium may be any form as long as the recording medium is a recording medium that can store a program and is readable by the apparatus such as a CD-ROM. The functions obtained by the installation or the download in advance in this way may be functions realized in cooperation with an OS (Operating System) or the like in the apparatus.

The invention has been explained in detail according to the specific forms. However, it will be apparent to those having ordinary skill in the art that various modifications and alterations may be made without departing from the spirit and the scope of the invention.

As described above in detail, according to the invention, in the image processing system in which the driver apparatus gives a command for execution of processing to the image processing apparatus and causes the image processing apparatus to execute the predetermined processing, it is possible to provide a technique that can contribute to a reduction in a burden of work on the user.

What is claimed is:

1. An image processing apparatus that executes, based on a command transmitted from a driver apparatus, the image processing apparatus comprising:
   a setting-information acquiring unit configured to acquire setting information indicating setting contents of processing instructed by the driver apparatus;
   a setting-information displaying unit configured to display the setting information acquired by the setting-information acquiring unit;
   an operation accepting unit configured to accept operation for the setting-information displayed by the setting-information displaying unit; and
   a setting executing unit configured to execute processing with the setting contents that reflect the operation accepted by the operation accepting unit, wherein
   the driver apparatus is capable of executing a command in a processing mode of one of a test mode for examining, on the basis of a result of processing in the image processing apparatus, suitability of setting contents of the processing and a normal mode for causing the image processing apparatus to execute processing on the basis of the setting contents, and
   the image processing apparatus includes:
   a mode discriminating unit configured to discriminate the processing mode if a command for execution of processing is received from the driver apparatus; and
   a notifying unit configured to notify, if the mode discriminating unit discriminates that the processing mode is the test mode, that the processing mode is the test mode,
   wherein an arrangement of respective setting items in an interface screen for displaying the setting information in the setting-information displaying unit if the processing mode is the test mode is the same as an arrangement of respective setting items in an interface screen for performing setting operation for the predetermined processing in the driver apparatus.

2. An image processing apparatus according to claim 1, wherein the setting-information acquiring unit acquires, during execution of spool processing for processing object data transmitted from the driver apparatus, the setting information transmitted from the driver apparatus to the image processing apparatus.

3. An image processing apparatus according to claim 1, wherein the setting-information acquiring unit requests the setting information when the mode discriminating unit discriminates that the processing mode is the test mode.

4. An image processing apparatus according to claim 1, comprising an identification-information acquiring unit configured to acquire identification information for identifying a user who performs operation for the setting information displayed by the setting-information displaying unit, wherein
   the setting-information displaying unit displays the setting information acquired by the setting-information acquiring unit and the identification information acquired by the identification-information acquiring unit as a list in association with each other.

5. An image processing method performed by an image processing apparatus, on the basis of a command transmitted from a driver apparatus, predetermined processing corresponding to the command, the image processing method comprising the steps of:

acquiring setting information indicating setting contents of processing instructed by the driver apparatus;

displaying the setting information acquired in the setting-information acquiring step;

accepting operation for the setting-information displayed by the setting-information displaying step; and executing processing with setting contents that reflect the operation accepted in the operation accepting step, wherein the driver apparatus is capable of executing a command in a processing mode of one of a test mode for examining, on the basis of a result of processing in the image processing apparatus, suitability of setting contents of the processing and a normal mode for causing the image processing apparatus to execute processing on the basis of the setting contents, and the image processing method includes the steps of:

discriminating the processing mode if a command for execution of processing is received from the driver apparatus; and notifying, if it is discriminated in the mode discriminating step that the processing mode is the test mode, that the processing mode is the test mode, wherein an arrangement of respective setting items in an interface screen for displaying the setting information in the setting-information displaying step if the processing mode is the test mode is the same as an arrangement of respective setting items in an interface screen for performing setting operation for the predetermined processing in the driver apparatus.

6. An image processing method according to claim 5, wherein, in the setting-information acquiring step, the setting information transmitted from the driver apparatus to the image processing apparatus is acquired during execution of spool processing for processing object data transmitted from the driver apparatus.

7. An image processing method according to claim 5, wherein, in the setting-information acquiring step, the setting information is requested when it is discriminated in the mode discriminating step that the processing mode is the test mode.

8. An image processing method according to claim 5, comprising the steps of:

acquiring identification information for identifying a user who performs operation for the setting information displayed by the setting-information displaying step, wherein in the setting-information displaying step, the setting information acquired in the setting-information acquiring step and the identification information acquired in the identification-information acquiring step are displayed as a list in association with each other.

9. An image processing program executing on a computer to execute processing for causing an image processing apparatus to execute, on the basis of a command transmitted from a driver apparatus, predetermined processing corresponding to the command, the image processing program causing the computer to execute:

a setting-information acquiring step of acquiring setting information indicating setting contents of processing instructed by the driver apparatus;

a setting-information displaying step of displaying the setting information acquired in the setting-information acquiring step;

an operation accepting step of accepting operation for the setting-information displayed by the setting-information displaying step; and a setting executing step of executing processing with setting contents that reflect the operation accepted in the operation accepting step, wherein the driver apparatus is capable of executing a command in a processing mode of one of a test mode for examining, on the basis of a result of processing in the image processing apparatus, suitability of setting contents of the processing and a normal mode for causing the image processing apparatus to execute processing on the basis of the setting contents, and the image processing program includes:

a mode discriminating step of discriminating the processing mode if a command for execution of processing is received from the driver apparatus; and a notifying step of notifying, if it is discriminated in the mode discriminating step that the processing mode is the test mode, that the processing mode is the test mode, wherein an arrangement of respective setting items in an interface screen for displaying the setting information in the setting-information displaying step if the processing mode is the test mode is the same as an arrangement of respective setting items in an interface screen for performing setting operation for the predetermined processing in the driver apparatus.

10. An image processing program according to claim 9, in the setting-information acquiring step, the setting information transmitted from the driver apparatus to the image processing apparatus is acquired during execution of spool processing for processing object data transmitted from the driver apparatus.

11. An image processing program according to claim 9, wherein, in the setting-information acquiring step, the setting information is requested when it is discriminated in the mode discriminating step that the processing mode is the test mode.

12. An image processing program according to claim 9, comprising:

an identification-information acquiring step of acquiring identification information for identifying a user who performs operation for the setting information displayed by the setting-information displaying unit, wherein in the setting-information displaying step, the setting information acquired in the setting-information acquiring step and the identification information acquired in the identification-information acquiring step are displayed as a list in association with each other.

* * * * *